United States Patent
Wu et al.

(10) Patent No.: US 10,552,628 B2
(45) Date of Patent: Feb. 4, 2020

(54) METHOD AND DEVICE FOR ACCESSING AND PROCESSING IMAGE

(71) Applicant: ZTE Corporation, Shenzhen (CN)

(72) Inventors: Zhao Wu, Shenzhen (CN); Rui Chen, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 60 days.

(21) Appl. No.: 15/512,733

(22) PCT Filed: Jan. 23, 2015

(86) PCT No.: PCT/CN2015/071508
§ 371 (c)(1),
(2) Date: Mar. 20, 2017

(87) PCT Pub. No.: WO2015/131713
PCT Pub. Date: Sep. 11, 2015

(65) Prior Publication Data
US 2017/0300707 A1    Oct. 19, 2017

(30) Foreign Application Priority Data

Sep. 19, 2014    (CN) .......................... 2014 1 0483237

(51) Int. Cl.
*G06F 21/62* (2013.01)
*G06T 7/12* (2017.01)
(Continued)

(52) U.S. Cl.
CPC ....... *G06F 21/6218* (2013.01); *G06K 9/4604* (2013.01); *G06T 7/12* (2017.01); *G06T 7/13* (2017.01); *H04N 1/3872* (2013.01)

(58) Field of Classification Search
CPC ... G06F 21/6218; G06F 21/60; H04N 1/3872; G06K 9/4604; G06T 7/13; G06T 7/12; G06T 1/0021
See application file for complete search history.

(56) References Cited

U.S. PATENT DOCUMENTS

| 6,067,399 A | 5/2000 | Berger |
| 2008/0013727 A1* | 1/2008 | Uemura ................. H04N 1/448 380/243 |

(Continued)

FOREIGN PATENT DOCUMENTS

| CN | 1771727 A | 5/2006 |
| CN | 103455770 A | 12/2013 |

(Continued)

OTHER PUBLICATIONS

Cavallaro, Andrea. "Adding Privacy Constraints to Video-Based Applications." EWIMT. 2004. (Year: 2004).*

(Continued)

*Primary Examiner* — Menatoallah Youssef
(74) *Attorney, Agent, or Firm* — Cantor Colburn LLP (57) ABSTRACT

A method and device for processing and accessing image are provided. The image processing method includes: one or more protected areas are determined in an original picture to be processed, image data of the one or more protected areas are protected by adding access rights, one or more independent sub-image data corresponding to the one or more protected areas are obtained, and then the one or more protected areas in the original picture are shielded to obtain main image data, the images in the protected areas being invisible in the shielded original picture; and the one or more obtained independent sub-image data and the obtained main image data are associatively stored.

12 Claims, 4 Drawing Sheets

(51) Int. Cl.
  *G06T 7/13* (2017.01)
  *G06K 9/46* (2006.01)
  *H04N 1/387* (2006.01)

(56) References Cited

U.S. PATENT DOCUMENTS

2012/0070031 A1* 3/2012 Kato .................... G06T 1/0071
  382/100
2016/0055393 A1* 2/2016 Feng .................... G06K 9/6202
  382/199

FOREIGN PATENT DOCUMENTS

| EP | 2164056 A2 | 3/2010 |
|---|---|---|
| JP | 4335476 A | 11/1992 |
| JP | 981461 A | 3/1997 |
| JP | 9275523 | 10/1997 |

OTHER PUBLICATIONS

A Cavallaro: "Adding Privacy Constraints to Video-Based Applications", Proceedings of the European Workshop for the Intergration of Knowledge, Nov. 25, 2004, pp. 1-8, XP055382434.
A Cavallaro: "Privacy in Video Suveillance, In the Spotlight", IEEE Signal Processing Magazine, vol. 24, No. 2. Mar. 1, 2007, pp. 1660168, XP011201344.
European Search report for corresponding application EP 1575 8959; Report dated Jul. 7, 2017.
International Search Report for corresponding application PCT/CN2015/071508 filed on Jan. 23, 2015; dated Jul. 3, 2015.

* cited by examiner

METHOD AND DEVICE FOR ACCESSING AND PROCESSING IMAGE

TECHNICAL FIELD

The present disclosure relates to the field of image processing, and in particular to methods and devices for accessing and processing image.

BACKGROUND

Recently, with the rapid development of Internet and mobile devices, users share pictures or videos in daily life more frequently. Meanwhile, the security problem of network sharing of pictures or videos is prominent day by day. A method mainly used at present includes the means of setting different user rights for an entire picture or video to limit sharing of the picture or video. But such an all-or-none way cannot meet multiple demands of users for picture sharing, thereby reducing the satisfaction of user experience.

SUMMARY

In the embodiments of the present disclosure, methods and devices for accessing and processing image are provided, intended to solve the problem in the related art where user demands cannot be met by directly performing right control over an entire picture.

In one aspect, the present disclosure relates to a method for image processing. In certain embodiments, the method may include: one or more protected areas are determined in an original picture to be processed; image data of the one or more protected areas are protected by adding access rights, so as to obtain one or more independent sub-image data corresponding to the one or more protected areas; the one or more protected areas in the original picture are shielded to obtain main image data; the one or more obtained independent sub-image data and the obtained main image data are associatively stored.

In certain embodiments, the step that one or more protected areas are determined in an original picture to be processed may include: one or more closed areas delineated on the original picture by a user are detected, each of the closed areas being a protected area; or an edge of the original picture is detected; the image is divided into different closed areas according to the detected edge; at least one closed area is selected from the closed areas as a protected area; or at least one closed area is selected from the closed areas, and an area covered by a circumscribed rectangle, a circumscribed circle or a circumscribed triangle is taken as a protected area.

In certain embodiments, the step that the one or more obtained independent sub-image data and the obtained main image data are associatively stored may include: the one or more obtained independent sub-image data and the obtained main image data are integrally stored; or the one or more obtained independent sub-image data and the obtained main image data are independently stored, and a corresponding relationship database is generated.

In certain embodiments, the step that image data of the one or more protected areas are protected by adding access rights may include: access rights for the one or more protected areas are determined, and image data of each protected area are extracted from the original picture; and the image data of each protected area are encoded by adding access right according to the access right for each protected area, so as to obtain independent sub-image data corresponding to each protected area.

In certain embodiments, before the image data of each protected area is protected by adding the access right, the method may further include: at least one sub-protected area is determined in the one or more protected areas; in the process of protecting the image data of the one or more protected areas by adding the access rights, determining the access rights for the one or more protected areas includes determining an access right for at least one sub-protected area in the one or more protected areas; and coding the one or more protected areas by adding access right includes independently coding image data of the at least one sub-protected area by adding access right according to the access right for the at least one sub-protected area.

In certain embodiments, each protected area in the original picture may be processed by using at least one of the following modes: mosaic processing, blur processing, colour transformation processing, and deformation processing.

In another aspect, the present disclosure relates to a method for accessing image. In certain embodiments, the method may include: after a picture to be accessed is processed by using the aforementioned image processing method, when a user accesses the processed picture, an access right of the user is acquired; image data of a protected area corresponding to the picture are acquired according to the access right of the user; a corresponding image is generated according to the acquired image data of the protected area and main image data of the picture and is displayed for the user.

In yet another aspect, the present disclosure relates to a device for image processing. In certain embodiments, the device may include an area determination module, a protection module, a shielding module and a storage control module, wherein the area determination module is configured to determine one or more protected areas in an original picture to be processed; the protection module is configured to protect image data of the one or more protected areas by adding access rights, so as to obtain one or more independent sub-image data corresponding to the one or more protected areas; the shielding module is configured to shield the one or more protected areas in the original picture to obtain main image data; and the storage control module is configured to associatively store the one or more obtained independent sub-image data and the obtained main image data.

In certain embodiments, the area determination module may include an area detection sub-module, which is configured to detect one or more closed areas delineated on the original picture by a user, each of the closed areas being a protected area.

In an alternative way, the area determination module may include an edge detection sub-module, an area determination sub-module and a protected area selection sub-module, wherein the edge detection sub-module is configured to detect an edge of the original picture; the area determination sub-module is configured to divide the image into different closed areas according to the detected edge; and the protected area selection sub-module is configured to select at least one closed area from the closed areas as a protected area, or select at least one closed area from the closed areas, and take an area covered by a circumscribed rectangle, a circumscribed circle or a circumscribed triangle as a protected area.

In certain embodiments, the storage control module may include an integral storage control sub-module, which is configured to integrally store the one or more obtained independent sub-image data and the obtained main image data; or the storage control module may include a separated storage control sub-module, which is configured to independently store the one or more obtained independent sub-image data and the obtained main image data, and generate a corresponding relationship database.

In certain embodiments, the protection module may include an access right setting sub-module, a data extraction sub-module and a coding sub-module, wherein the access right setting sub-module is configured to determine access rights for the one or more protected areas; the data extraction sub-module is configured to extract image data of each protected area from the original picture; and the coding sub-module is configured to code the image data of each protected area by adding access right according to the access right for each protected area, so as to obtain independent sub-image data corresponding to each protected area.

In certain embodiments, the shielding module may include at least one of a mosaic processing sub-module, a blur processing sub-module, a colour transformation processing sub-module and a deformation processing sub-module, wherein the mosaic processing sub-module is configured to perform mosaic processing on each protected area in the original picture; the blur processing sub-module is configured to perform blur processing on each protected area in the original picture; the colour transformation processing sub-module is configured to perform colour transformation processing on each protected area in the original picture; and the deformation processing sub-module is configured to perform deformation processing on each protected area in the original picture.

In a further aspect, the present disclosure relates to a device for accessing image. In certain embodiments, the device may include a right acquisition module, a protection data acquisition module, a main image data acquisition module and a display module. The right acquisition module is configured to acquire, when a user accesses a picture processed via the aforementioned image processing device, an access right of the user. The main image data acquisition module is configured to acquire main image data of the picture. The protection data acquisition module is configured to acquire image data of a protected area corresponding to the picture according to the access right of the user. The display module is configured to generate a corresponding image according to the acquired image data of the protected area and the main image data of the picture, and display the image for the user.

In another aspect, the present disclosure relates to a computer program and a storage device. In certain embodiments, the computer program may include a program instruction. When the program instruction is executed by an image processing device, the device may implement the aforementioned image processing method, and the storage device stores the computer program.

The beneficial effects of the embodiments of the present disclosure will be introduced hereafter.

In the provided methods and devices for accessing and processing image, firstly, one or more protected areas are determined in an original picture to be processed, and image data of the one or more protected areas are protected by adding access rights, then one or more independent sub-image data corresponding to the one or more protected areas are obtained, and the one or more protected areas in the original picture are shielded to obtain main image data, thus in the shielded original picture, the images in the protected areas are invisible. Finally, the one or more obtained independent sub-image data and the obtained main image data are associatively stored. When a user access a picture having undergone the aforementioned procedure, for the main image data, the user can freely access to it without any access rights. But for the images in the protected areas, they must be selectively displayed according to the access rights of the user. Obviously, in the embodiments of the present disclosure, hierarchical management and display of different areas of an image is implemented according to access rights, at the same time, the publically display and security protection of information in the image are available. The use is more flexible. Further, compared with the existing 'all-or-none' way, the present disclosure can meet demands of the user, and is simple and reliable to implement.

DETAILED DESCRIPTION OF THE EMBODIMENTS

The embodiments of the present disclosure will be illustrated in detail hereinbelow with the drawings. It is important to note that the embodiments in the present application and the features in the embodiments may be randomly combined without conflicts. In addition, although a logic sequence is shown in the flowchart, the shown or described steps may be executed in a sequence different from the sequence here under certain conditions.

Embodiment One

Figure 1:
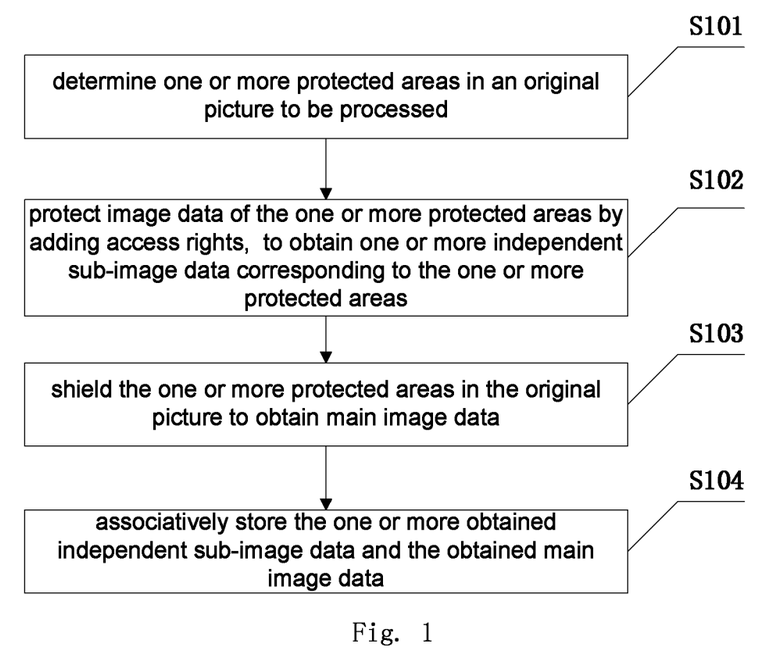
FIG. 1 is a flowchart of a method for image processing according to embodiment 1 of the present disclosure.

Referring to FIG. 1, a method for image processing provided in the present embodiment includes the following steps S101-S104.

At step S101, one or more protected areas are determined in an original picture to be processed.

At step S102, image data of the one or more protected areas are protected by adding access rights, so as to obtain one or more independent sub-image data corresponding to the one or more protected areas.

At step S103, the one or more protected areas in the original picture are shielded to obtain main image data.

At step S104, the one or more obtained independent sub-image data and the obtained main image data are associatively stored.

It shall be understood that the execution sequences of steps S102 and S103 are not strictly limited. The two steps may be performed simultaneously or non-simultaneously.

Figure 2:
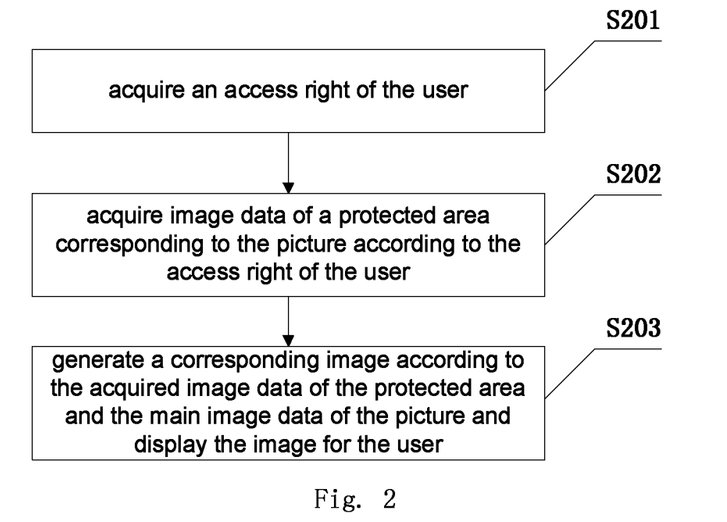
FIG. 2 is a flowchart of a method for accessing image according to embodiment one of the present disclosure.

The original picture to be processed in the present embodiment may be a picture to be shared by a terminal. The sharing mode may be: sharing the picture by transferring the picture to other terminal users in a network mode, a Bluetooth mode, an infrared mode, an NFC mode and the like, or the picture may be directly checked on the terminal by other users. It is important to note that when the picture is shared in the previous mode, the independent sub-image data and the main image data associatively stored after the original picture is processed are sent to other terminals in a network mode, a Bluetooth mode, an infrared mode, an NFC mode and the like. When other terminal users check the picture, it is necessary to decide, according to an access right of the user, whether each independent sub-image datum can be acquired and accessed. When the picture is shared in the subsequent mode, it is also necessary to decide, according to the access right of the user, whether each independent sub-image datum can be acquired and accessed. Referring to FIG. 2, a specific process includes the following steps S201 to S203.

At step S201, when a user accesses a picture having undergone the aforementioned procedure, an access right of the user is acquired. Access rights for main image data of the picture may not be limited, and the user may directly access the picture.

At step S202, image data of a protected area corresponding to the picture are acquired according to the access rights of the user.

At step S203, a corresponding image is generated according to the acquired image data of the protected area and the main image data of the picture and is displayed for the user.

In step S101, the step of determining at least one protected area in an original picture to be processed may adopt any one of the following modes.

Mode One:

A protected area is directly delineated on a picture by a user. Specifically, one or more closed areas delineated on the original picture by the user are detected, each of the closed areas being a protected area.

Mode Two:

An edge of the original picture is detected. Specifically, the whole picture is scanned to perform edge detection. The image is divided into different closed areas according to the detected edge. In the step, isolated points or line segments may be removed, and then the boundary is closed to form different areas. At least one closed area is directly selected from the obtained closed areas as a protected area; or at least one closed area is selected from the obtained closed areas, and an area covered by a circumscribed rectangle, a circumscribed circle or a circumscribed triangle is taken as a protected area, or the range of a larger area in the original picture is acquired as a protected area according to other principles.

Figure 3:
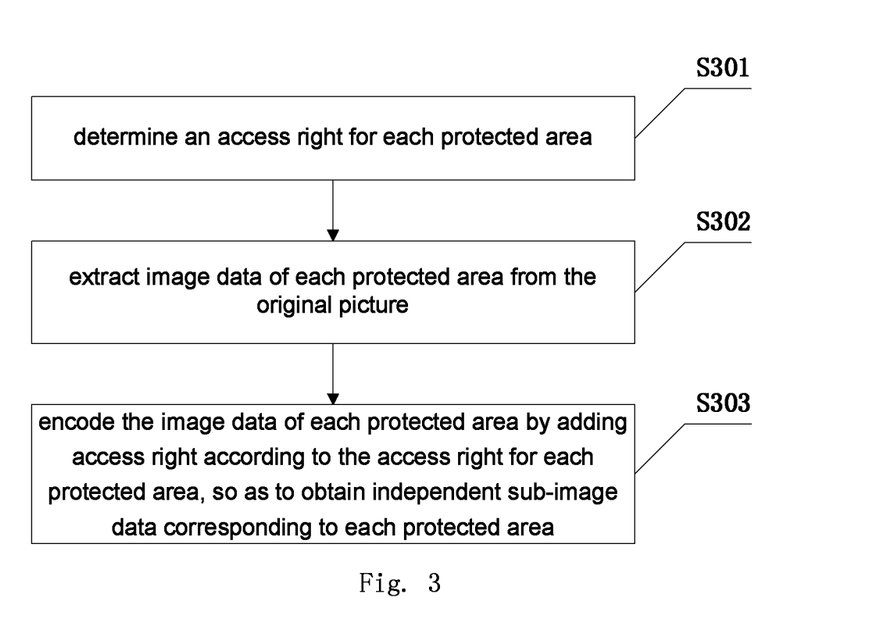
FIG. 3 is a flowchart of coding of image data of a protected area by adding access rights according to embodiment one of the present disclosure.

In step S102, the image data of each protected area are coded by adding access right. Referring to FIG. 3, the step includes the following steps S301 to S303.

At step S301, an access right for each protected area is determined, that is, the access right for each protected area is calibrated. The access rights for all protected areas may be set to be different, or may be designed to be identical. The access rights may be set according to actual demands of the user specifically.

At step S302, image data of each protected area are extracted from the original picture. At step S303, the image data of each protected area are coded by adding access right according to the access right for each protected area, so as to obtain independent sub-image data corresponding to each protected area.

It shall be understood that the time sequences of step S302 and step S301 are not strictly limited. The two steps may be performed simultaneously or non-simultaneously. For example, step S301 may be executed, and then step S302 is executed.

In the present embodiment, in order to better implement safety control and to improve the reliability and flexibility of safety control, a new protected area may be further calibrated in the aforementioned selected protected area to generate higher-stage image hierarchical protection, and multi-stage image hierarchical protection may be accumulatively generated in sequence according to the rule. The process is as follows specifically.

Before the image data of each of the selected protected areas is protected by adding the access right, at least one sub-protected area is determined in at least one protected area, and in a subsequent process of protecting the image data of the protected area by adding the access rights, determining the access right for the protected area further includes determining an access right for the sub-protected area in the protected area independently; and coding the protected area by adding access right further includes coding image data of the sub-protected area by adding access right according to the access right for the sub-protected area independently.

In step S103, each protected area in the original picture is shielded by changing the original data in the protected area to make the original image data cannot be accessed. The shielding processing may adopt at least one of the following processing modes: mosaic processing, blur processing, colour transformation processing, and deformation processing. For example, a protected area may selectively undergo mosaic processing, in this case, it is necessary to extract image data of the protected area from the original picture, and then to perform mosaic processing so as to shield important information. For another example, colour transformation processing and deformation processing may be performed on the shielded area simultaneously so as to shield important information. For another example, when there are multiple protected areas, one protected area may undergo mosaic processing selectively while the other protected areas may undergo blur processing selectively.

in step S103, associatively storing the one or more obtained independent sub-image data and the obtained main image data includes: the one or more obtained independent sub-image data and the obtained main image data are integrally stored; or the one or more obtained independent sub-image data and the obtained main image data are independently stored, and a corresponding relationship database is generated, in order that corresponding data may be found according to a corresponding relationship during subsequent checking.

The above two storage modes may be selectively set according to specific application scenarios.

In step 202, when it is determined that the user does not have an access right to access any one protected area, image data of any protected area cannot be acquired, and correspondingly, only main image data are displayed for the user after being decoded in step S203. In step S202, when it is determined that the user has an access right to access a protected area, the data of the protected area are acquired. Correspondingly, in step S203, the data of the protected area are decoded to obtain sub-images of the area, the main image data are decoded to obtain a main image, and the sub-images and the main image are combined and displayed for the user.

Embodiment Two

Figure 4:
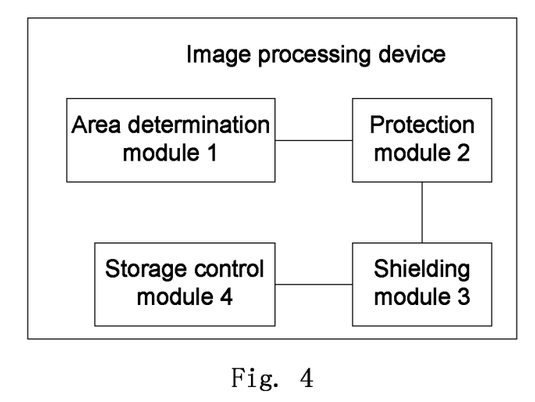
FIG. 4 is a structural diagram of a device for image processing according to embodiment two of the present disclosure.

Referring to FIG. 4, a device for image processing is provided by the embodiments. The device includes a processor, a program memory and a data memory, and further includes an area determination module 1, a protection module 2, a shielding module 3 and a storage control module 4. The area determination module 1 is suitable for determining one or more protected areas in an original picture to be processed. The protection module 2 is suitable for protecting image data of the one or more protected areas by adding access rights, so as to obtain one or more independent sub-image data corresponding to the one or more protected areas. The shielding module 3 is suitable for shielding the one or more protected areas in the original picture to obtain main image data. The storage control module 4 is suitable for associatively storing the one or more obtained independent sub-image data and the obtained main image data.

The original picture to be processed in the present embodiment may be a picture to be shared by a terminal. The sharing mode may be: sharing the picture by transferring the picture to other terminal users in a network mode, a Bluetooth mode, an infrared mode, an NFC mode and the like, or the picture may be directly checked on the terminal by other users. It is important to note that when the picture is shared in the previous mode, the independent sub-image data and the main image data associatively stored after the original picture is processed are sent to other terminals in a network mode, a Bluetooth mode, an infrared mode, an NFC mode and the like. When other terminal users check the picture, it is necessary to decide, according to an access right of the user, whether each independent sub-image datum can be acquired and accessed. When the picture is shared in the subsequent mode, it is also necessary to decide, according to the access right of the user, whether each independent sub-image datum can be acquired and accessed.

Figure 5:
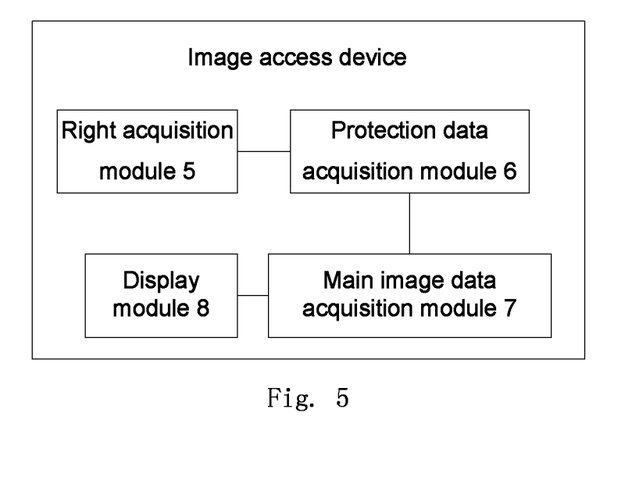
FIG. 5 is a structural diagram of an image access device according to embodiment two of the present disclosure.

Specifically, referring to FIG. 5, an image access device provided in the present embodiment includes a processor, a program memory and a data memory, and device further includes a right acquisition module 5, a protection data acquisition module 6, a main image data acquisition module 7 and a display module 8. The right acquisition module 5 is suitable for acquiring, when a user accesses a picture processed via the aforementioned image processing device, an access right of the user. The main image data acquisition module 6 is suitable for acquiring main image data of the picture. The protection data acquisition module 7 is suitable for acquiring image data of a protected area corresponding to the picture according to the access right of the user. The display module 8 is suitable for generating a corresponding image according to the acquired image data of the protected area and the main image data of the picture, and displaying the image for the user.

In the present embodiment, the area determination module 1 includes an area detection sub-module, suitable for detecting closed areas delineated on the original picture by a user, each of the closed areas being a protected area.

In an alternative way, the area determination module 1 includes an edge detection sub-module, an area determination sub-module and a protected area selection sub-module, wherein the edge detection sub-module is suitable for detecting an edge of the original picture, and scanning the whole picture to perform edge detection specifically; the area determination sub-module is suitable for dividing the image into different closed areas according to the detected edge, wherein in the step, isolated points or line segments may be removed, and then the boundary is closed to form different areas; and the protected area selection sub-module is suitable for: selecting at least one closed area from the closed areas as a protected area; or selecting at least one closed area from the closed areas, and take an area covered by a circumscribed rectangle, a circumscribed circle or a circumscribed triangle as a protected area; or acquiring the range of a larger area in the original picture as a protected area according to other principles.

The protection module 2 in the present embodiment includes an access right setting sub-module, a data extraction sub-module and a coding sub-module, wherein the access right setting sub-module is suitable for determining an access right for each protected area, that is, calibrating the access right for each protected area, wherein the access rights for all protected areas may be set to be different, or may be designed to be identical, and the access rights may be set according to actual demands of the user specifically; the data extraction sub-module is used for extracting image data of each protected area from the original picture; and the coding sub-module is used for encrypting the image data of each protected area by coding according to the access right for each protected area, so as to obtain independent sub-image data corresponding to each protected area.

In the present embodiment, in order to better implement safety control and to improve the reliability and flexibility of safety control, the area determination module 1 may further calibrate a new protected area in the aforementioned selected protected area to generate higher-stage image hierarchical protection, and multi-stage image hierarchical protection may be accumulatively generated in sequence according to the rule. The process is as follows specifically.

Before the protection module 2 accesses the image data of each of the selected protected areas by adding the access right, the area determination module 1 is also used for determining at least one sub-protected area in at least one protected area, and in a subsequent process of protecting the image data of the protected area by adding the access rights via the protection module 2, determining the access right for the protected area further includes determining an access right for the sub-protected area in the protected area independently; and coding the protected area by adding access right further includes coding image data of the sub-protected area by adding access right according to the access right for the sub-protected area independently.

The shielding module 3 shields each protected area in the original picture by changing the original data in the protected area so as to make the original image data cannot be accessed. The shielding module may include at least one of a mosaic processing sub-module, a blur processing sub-module, a colour transformation processing sub-module and a deformation processing sub-module, wherein the mosaic processing sub-module is suitable for performing mosaic processing on each protected area in the original picture;

the blur processing sub-module is suitable for performing blur processing on each protected area in the original picture;

the colour transformation processing sub-module is suitable for performing colour transformation processing on each protected area in the original picture; and the deformation processing sub-module is suitable for performing deformation processing on each protected area in the original picture.

The storage control module 4 in the present embodiment includes an integral storage control sub-module, suitable for integrally storing the independent sub-image data and the main image data; or the storage control module 4 includes a separated storage control sub-module, suitable for independently storing the independent sub-image data and the main image data, and generating a corresponding relationship database, in order that corresponding data may be found according to a corresponding relationship during subsequent checking.

When the right acquisition module 5 determines that the user does not have an access right to access any one protected area, the protection data acquisition module 6 cannot acquire image data of any protected area, and correspondingly, the display module 8 displays only main image data for the user after decoding. When the right acquisition module 5 determines that the user has an access right to access a protected area, the protection data acquisition module 6 acquires the data of the protected area. Correspondingly, in the display module 8, the data of the protected area are decoded to obtain sub-images of the area, the main image data are decoded to obtain a main image, and the sub-images and the main image are combined and displayed for the user.

Embodiment Three

Figure 6:
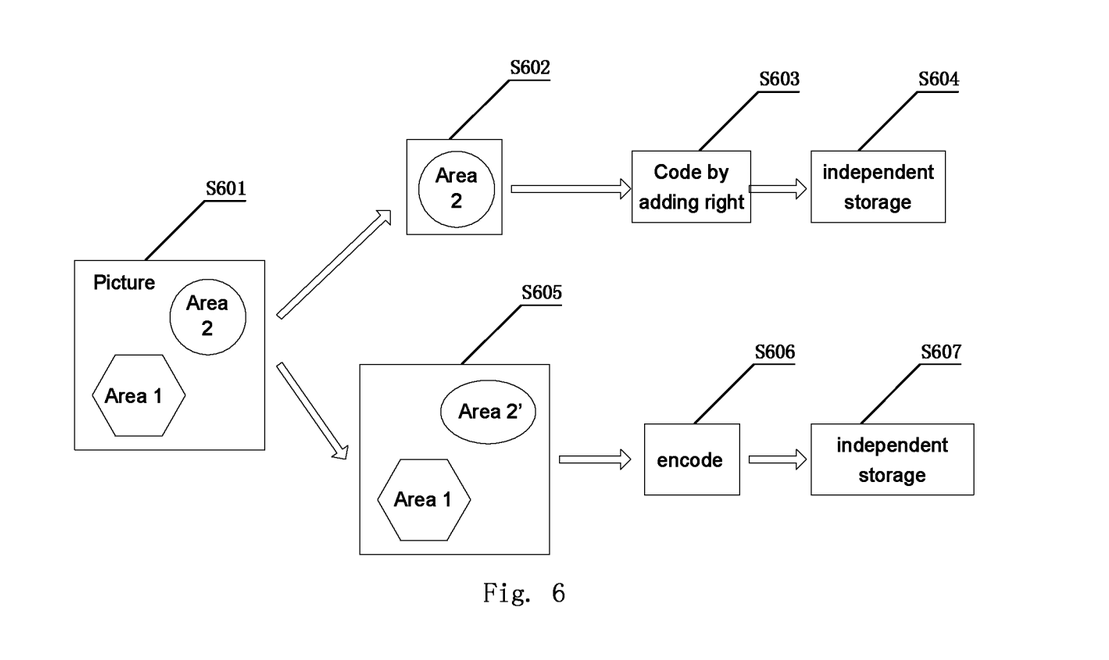
FIG. 6 is a flowchart of an image processing procedure according to embodiment three of the present disclosure.

FIG. 6 shows a procedure of processing a selected picture to be processed, which specifically includes the following steps S601 to S607.

At step S601, area division for different objects in the picture to be processed is automatically identified. The step specifically includes that: the whole picture is scanned to perform edge detection; isolated points or line segments are removed from the detected edge, and the boundary is closed to form different areas, area 1 and area 2 in FIG. 6, and a user selects area 2 as a protected area.

At step S602, the protected area is determined, area 2 is selected as the protected area, and an access right thereof is set, and image data of the area are extracted from the original picture.

At step S603, the image data of area 2 are coded by adding access rights to obtain independent sub-image data corresponding to area 2.

At step S604, the obtained independent sub-image data are independently stored, wherein independent storage needs to contain a corresponding relationship with main image data of the picture.

At step S605, the protected area in the original picture is shielded, that is, area 2 in the original picture is shielded to obtain area 2; and then the data of the original picture are extracted to obtain main image data.

At step S606, the obtained main image data are coded.

At step S607, the coded main image data are independently stored, wherein independent storage includes a corresponding relationship with the independent sub-image data of area 2.

In the present example, the independent sub-image data and main image data obtained finally may be integrally stored.

Figure 7:
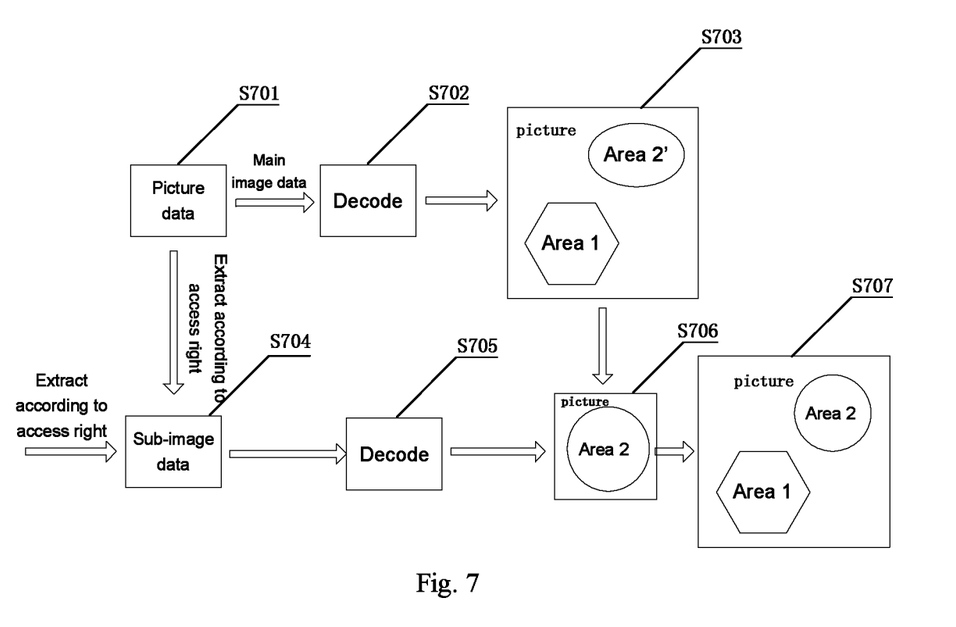
FIG. 7 is a flowchart of an image access procedure according to embodiment three of the present disclosure.

FIG. 7 shows a procedure of accessing a picture processed in FIG. 7, which includes the following steps S701 to S707.

At step S701, picture data (including main image data and corresponding independent sub-image data) and an access right of a user are acquired.

At step S702, the acquired main image data are decoded.

At step S703, a main image is obtained according to the decoded main image data.

At step S704, independent sub-image data of an accessible protected area are extracted according to the acquired access right. The step may adopt different extraction modes according to storage modes for the independent sub-image data and the main image data. As for an integral storage mode, the data are directly extracted from picture data according to the access right. As for an independent storage mode, the data are independently extracted from a corresponding database according to the access right.

At step S705, the extracted independent sub-image data are decoded by removing the access right.

At step S706, a sub-image of area 2 is obtained according to the decoded independent sub-image data.

At step S707, the sub-image of area 2 and the main image in step S703 are combined and then displayed for the user.

In step S704, if it is confirmed that there is no accessible protected area according to the acquired access right, only the main image is displayed for the user in step S707, and the image in the protected area being invisible to the user.

Obviously, the embodiments of the present disclosure enable hierarchical management of different areas of an image and, when accessed, hierarchical display according to access rights. Some information in an image may be publically displayed, whilst security protection of information requiring protection may be simultaneously implemented. The use is more flexible. Compared with an existing 'all-or-none' management mode, the present disclosure can meet demands of the user, and is simple and reliable to implement.

Those of ordinary skill in the art may understand that all or some steps in the aforementioned method may be completed by instructing relevant hardware via a program, and the program may be stored in a computer-readable storage medium such as a read-only memory, a magnetic disk or an optical disc. Alternatively, all or some steps in the aforementioned embodiments may be implemented by using one or more integrated circuits. Correspondingly, each module/unit in the aforementioned embodiments may be implemented in a hardware form or may be implemented in a software function module form. The present disclosure is not limited to combination of any specific hardware and software.

Certainly, the present disclosure may also have various other embodiments. Those skilled in the art may make various corresponding variations and transformations according to the present disclosure, but these corresponding variations and transformations shall fall within the scope of protection of the claims of the present disclosure.

What is claimed is:

1. A method for image processing, comprising:
   determining one or more protected areas in an original picture to be processed;
   protecting image data of the one or more protected areas by adding access rights, so as to obtain one or more independent sub-image data corresponding to the one or more protected areas;
   shielding the one or more protected areas in the original picture to obtain main image data; and
   associatively storing the one or more obtained independent sub-image data and the obtained main image data;
   wherein protecting image data of the one or more protected areas by adding access rights comprises: determining access rights for the one or more protected areas, and extracting image data of each protected area from the original picture; and coding the image data of each protected area by adding access right according to the access right for each protected area, so as to obtain independent sub-image data corresponding to each protected area;

wherein before the image data of each protected area is protected by adding the access right, the method further comprises: determining at least one sub-protected area in the one or more protected areas, wherein in the process of protecting the image data of the one or more protected areas by adding the access rights, the step of determining the access rights for the one or more protected areas comprises a step of determining an access right for at least one sub-protected area in the one or more protected areas; and the step of coding the one or more protected areas by adding access right comprises a step of independently coding image data of the at least one sub-protected area by adding access right according to the access right for the at least one sub-protected area.

2. The method according to claim 1, wherein the step of determining one or more protected areas in the original picture to be processed further comprises:
   detecting one or more closed areas delineated on the original picture by a user, each of the closed areas being a protected area;
   or,
   detecting an edge of the original picture;
   dividing the image into different closed areas according to the detected edge;
   selecting at least one closed area from the closed areas as a protected area; or selecting at least one closed area from the closed areas, and taking an area covered by a circumscribed rectangle, a circumscribed circle or a circumscribed triangle as a protected area.

3. The method according to claim 1, wherein associatively storing the one or more obtained independent sub-image data and the obtained main image data comprises:
   integrally storing the one or more obtained independent sub-image data and the obtained main image data;
   or independently storing the one or more obtained independent sub-image data and the obtained main image data, and generating a corresponding relationship database.

4. The method according to claim 1, wherein each protected area in the original picture is shielded by using at least one of the following modes: mosaic processing, blur processing, colour transformation processing, and deformation processing.

5. A method for accessing image, comprising:
   when a user accesses a picture, which has been processed by using the image processing method as claimed in claim 1, acquiring an access right of the user;
   acquiring image data of a protected area in the picture according to the access right of the user; and
   generating a corresponding image according to the acquired image data of the protected area and main image data of the picture, and displaying the corresponding image to the user.

6. A device for image processing, which comprises a hardware processor and a memory, wherein the hardware processor is configured to execute program modules stored in the memory, and the program modules comprise: an area determination module, a protection module, a shielding module and a storage control module, wherein
   the area determination module is configured to determine one or more protected areas in an original picture to be processed;
   the protection module is configured to protect image data of the one or more protected areas by adding access rights, so as to obtain one or more independent sub-image data corresponding to the one or more protected areas;
   the shielding module is configured to shield the one or more protected areas in the original picture to obtain main image data; and
   the storage control module is configured to associatively store the one or more obtained independent sub-image data and the obtained main image data;
   wherein the protection module comprises an access right setting sub-module, a data extraction sub-module and a coding sub-module, wherein the access right setting sub-module is configured to determine access rights for the one or more protected areas; the data extraction sub-module is configured to extract image data of each protected area from the original picture; and the coding sub-module is configured to code the image data of each protected area by adding access right according to the access right for each protected area, so as to obtain independent sub-image data corresponding to each protected area;
   wherein before the image data of each protected area is protected by adding the access right, the device is further configured to perform the following steps: determining at least one sub-protected area in the one or more protected areas, wherein in the process of protecting the image data of the one or more protected areas by adding the access rights, the step of determining the access rights for the one or more protected areas comprises a step of determining an access right for at least one sub-protected area in the one or more protected areas; and the step of coding the one or more protected areas by adding access right comprises a step of independently coding image data of the at least one sub-protected area by adding access right according to the access right for the at least one sub-protected area.

7. The device according to claim 6, wherein the area determination module comprises an area detection sub-module, which is configured to detect one or more closed areas delineated on the original picture by a user, each of the closed areas being a protected area;
   or,
   the area determination module comprises an edge detection sub-module, an area determination sub-module and a protected area selection sub-module, wherein the edge detection sub-module is configured to detect an edge of the original picture; the area determination sub-module is configured to divide the image into different closed areas according to the detected edge; and the protected area selection sub-module is configured to select at least one closed area from the closed areas as a protected area, or select at least one closed area from the closed areas, and take an area covered by a circumscribed rectangle, a circumscribed circle or a circumscribed triangle as a protected area.

8. The device according to claim 6, wherein the storage control module comprises an integral storage control sub-module, which is configured to integrally store the one or more obtained independent sub-image data and the obtained main image data; or the storage control module comprises a separated storage control sub-module, which is configured to independently store the one or more obtained independent sub-image data and the obtained main image data, and generate a corresponding relationship database.

9. The device according to claim 6, wherein the shielding module comprises at least one of a mosaic processing sub-module, a blur processing sub-module, a colour transformation processing sub-module and a deformation processing sub-module, wherein the mosaic processing sub-module is configured to perform mosaic processing on each protected area in the original picture;

the blur processing sub-module is configured to perform blur processing on each protected area in the original picture;

the colour transformation processing sub-module is configured to perform colour transformation processing on each protected area in the original picture; and the deformation processing sub-module is configured to perform deformation processing on each protected area in the original picture.

10. A device for accessing image, which comprises a hardware processor and a memory, wherein the hardware processor is configured to execute program modules stored in the memory, and the program modules comprise a right acquisition module, a protection data acquisition module, a main image data acquisition module and a display module, wherein the right acquisition module is configured to acquire, when a user accesses a picture processed via the image processing device as claimed in claim 8, an access right of the user;

the main image data acquisition module is configured to acquire main image data of the picture;

the protection data acquisition module is configured to acquire image data of a protected area corresponding to the picture according to the access right of the user; and the display module is configured to generate a corresponding image according to the acquired image data of the protected area and the main image data of the picture, and display the corresponding image for the user.

11. The device according to claim 7, wherein the shielding module comprises at least one of a mosaic processing sub-module, a blur processing sub-module, a colour transformation processing sub-module and a deformation processing sub-module, wherein the mosaic processing sub-module is configured to perform mosaic processing on each protected area in the original picture;

the blur processing sub-module is configured to perform blur processing on each protected area in the original picture;

the colour transformation processing sub-module is configured to perform colour transformation processing on each protected area in the original picture; and the deformation processing sub-module is configured to perform deformation processing on each protected area in the original picture.

12. The device according to claim 8, wherein the shielding module comprises at least one of a mosaic processing sub-module, a blur processing sub-module, a colour transformation processing sub-module and a deformation processing sub-module, wherein the mosaic processing sub-module is configured to perform mosaic processing on each protected area in the original picture;

the blur processing sub-module is configured to perform blur processing on each protected area in the original picture;

the colour transformation processing sub-module is configured to perform colour transformation processing on each protected area in the original picture; and the deformation processing sub-module is configured to perform deformation processing on each protected area in the original picture.

\* \* \* \* \*